2,639,343

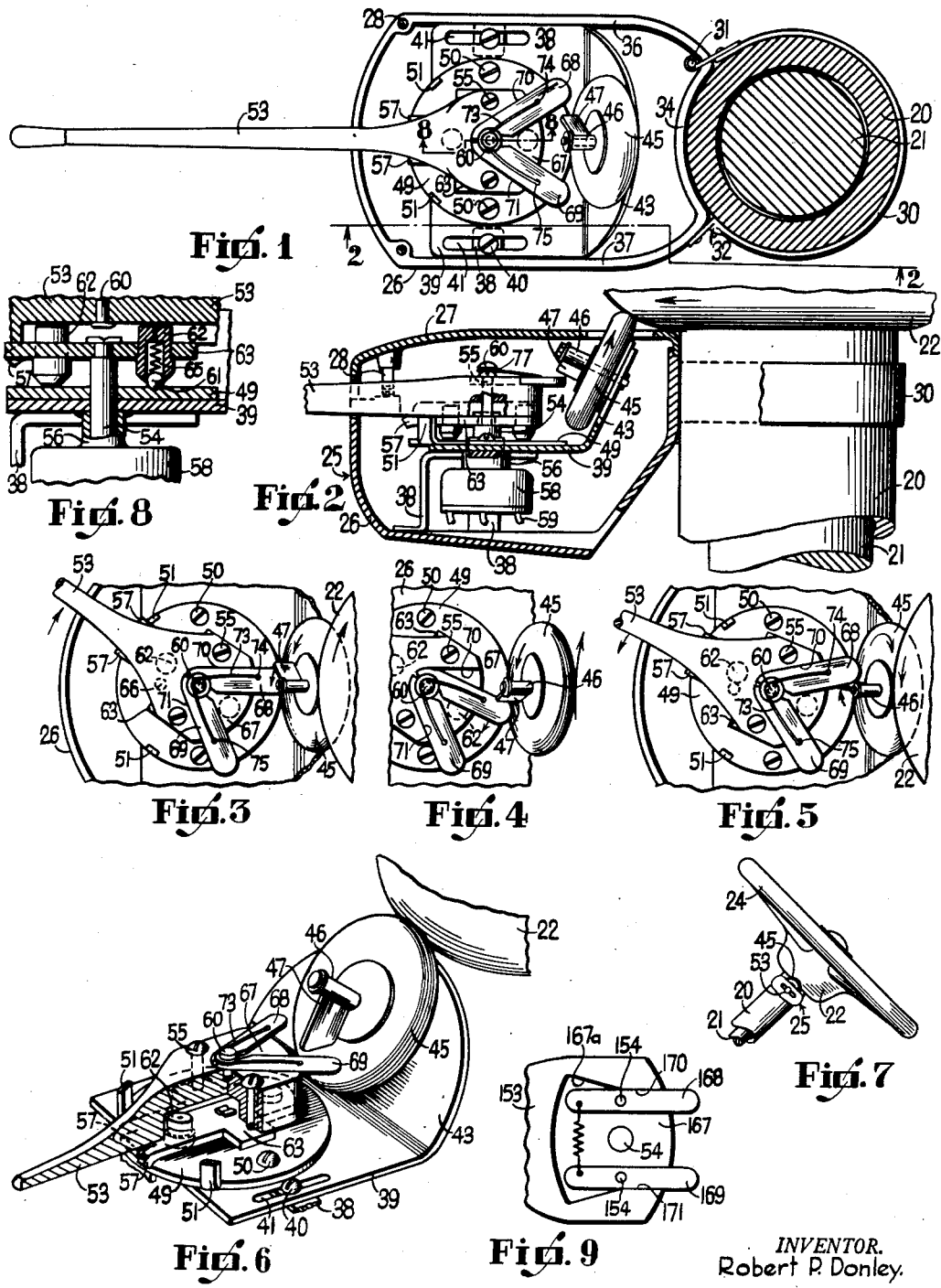
May 19, 1953 — R. P. DONLEY — 2,639,343
TURN SIGNAL
Filed July 7, 1951
INVENTOR.
Robert P. Donley.
ATTORNEY Patented May 19, 1953

UNITED STATES PATENT OFFICE 2,639,343

TURN SIGNAL

Robert P. Donley, Columbus, Ohio, assignor to Columbus Metal Products, Inc., Columbus, Ohio, a corporation of Ohio Application July 7, 1951, Serial No. 235,645

4 Claims. (Cl. 200—59)

The present invention relates to mechanism for actuating direction signal switches for vehicles. Such mechanism, including the switch, is embodied as a unit which may be attached to the steering column of the vehicle and includes a lever for moving the switch from the "off" position to either of two "on" positions. The mechanism is driven by a rotating part of the steering mechanism for automatically resetting the switch to the "off" position after the turn has been completed. It is the usual practice to include a wheel in the mechanism which engages a rotating part of the steering mechanism. This wheel is driven in one direction, when the steering mechanism is turned to make a right turn, and driven in the opposite direction, when the steering mechanism is operated to make a left turn.

In the instant application two resetting levers are actuated by the hand operated lever. Stops are provided on the hand operated lever for each of the two levers; a spring mechanism is employed for yieldingly holding both levers against their respective stops. A rotating actuator on the wheel and the free ends of the two resetting levers are so arranged, with respect to one another, that when the hand operated lever is in the neutral position, that is, when the switch is in the "off" position, the actuator will not engage either of the said resetting levers. When the hand operated lever is moved from its neutral position to a turn indicating position, one of the resetting levers is brought into the path of movement of the actuator on the wheel. The resetting levers are so pivoted and the stops and spring are so arranged, that while the steering mechanism is turned to make the turn indicated by the signal, the actuator will move the resetting lever away from its stop, the spring causing the resetting lever to return to its stop after the actuator passes over the same. When the turn has been completed and the steering mechanism is actuated to right the direction of the vehicle, the wheel will be rotated in the opposite direction by the steering mechanism, and the actuator will then engage the resetting lever lying in its path, and, since this lever is in abutting relation with its stop, it will cause the hand operated lever to be returned to its neutral position.

The objects and advantages of the present invention will be more apparent from the following description, reference being had to the accompanying drawings wherein preferred forms of the invention are shown.

In the drawings:

Fig. 1 is a top plan view of the signal switch actuating mechanism, showing the same attached to the steering column of a vehicle, the cover of the housing being removed;

Fig. 2 is a side view of the mechanism, showing the housing therefor in sections, the section for the housing being taken along line 2—2 of Fig. 1;

Fig. 3 is a fragmentary, sectional, top plan view, showing the hand operated lever in a position in which it is placed when a right hand turn is being made, the arrow on the driving wheel indicating the direction of rotation thereof;

Fig. 4 is a view similar to Fig. 3 but showing the driving wheel actuator in a position in which it is engaging one of the two resetting levers;

Fig. 5 is a view similar to Fig. 3 but showing the position of the actuator on the wheel when the steering mechanism is actuated to right the direction of the vehicle;

Fig. 6 is a perspective view of the mechanism showing the hand operated lever in neutral position, part of the handle being shown in section.

Fig. 7 is a side view of a steering column, steering wheel and the signal mechanism attached thereto;

Fig. 8 is a sectional view taken on line 8—8 of Fig. 1; and

Fig. 9 is a fragmentary top plan view showing another aspect of the invention.

Referring generally to the drawings, the steering column, shown at 20, houses the steering shaft 21. A steering wheel hub 22 is attached to the shaft 21 and it in turn carries the steering wheel 24. A switch and switch actuating housing is shown at 25, including the cup 26 and the cover 27. The cover 27 is suitably secured to the cup 26 by screws 28. An adjustable strap 30 has its ends connected with the opposite sides of the cup 26 at one end of said cup as at 31 and 32. Said end 34 of the cup 26 is curved inwardly preferably to conform to the curvature of the steering column 20. The strap 30 surrounds the steering column and, as previously stated, is adjustable for tightly clamping the housing 25 to the column.

Referring more in detail to the drawings, each of the side walls 36 and 37 is provided with an inwardly extending boss 38. The top side of these bosses 38 carry a plate 39, which plate is attached to the bosses by screws 40, threaded into the top side of the bosses 38. Slots 41 are formed in the plate, for receiving the shanks of the screws 40, permitting the adjustment of the plate, with respect to the housing 25, so that the plate can be adjustably held in position with respect to the hub 22 of the steering mechanism. As viewed in the drawings, the right end 43 of the plate 39 is bent outwardly and upwardly towards the hub 22. A friction wheel 45 or roller is suitably journaled on the angling portion 43. The rim of this wheel is preferably formed of friction material, such as rubber, and it is arranged to be engaged by the hub 22 so as to be rotated thereby when the hub is rotated. The rotating shaft 46 of the wheel 45 carries an actuator 47. When the hub 22 is rotated the actuator 47 is rotated.

A bearing plate 49 is secured to the top side of the horizontal portion of plate 39 by screws 50. This bearing plate is provided with upstanding ears 51 which are spaced from one another at equal distances on opposite sides of a vertical plane passing through the center of the plate 49 and the axis for the wheel 45. These ears form stops for a hand operated lever 53. Lever 53 is adapted to actuate a vertically extending shaft 54. Shaft 54 is journaled in a shaft column 56. This shaft column is secured to the plate 49 and extends therebelow. The shaft column also carries a housing 58 at its lower end. The shaft 54 extends into this housing 58 for actuating the switch mechanism contained therein. Some of the wires connected with switch 58 are shown at 59. The upper end of shaft 54 is suitably secured to a plate 63, and the handle lever 53 is secured to the plate 63 by screws 55. Downwardly extending ears 57 are formed on the plate 63. These ears form stops which cooperate with stops 51 on plate 49 to limit the movement of lever 53.

The means for retaining the lever 53 in its neutral or either of its "on" positions comprises two spring pressed balls 61 which are carried by sockets 62 and frictionally bear upon the plate 49. One of the balls 61 and the socket therefor is shown in Fig. 8. The sockets 62 are suitably secured to the plate 63. Each of the balls 61 is held in its lowermost position by a spring 65 which is interposed between the top of the ball and upper wall of socket 62. Depression or socket 66 is formed in the plate 49 which receive the ball 61 when the lever 53 is in neutral position. It will be understood that similar sockets could be formed for receiving the balls when the lever 53 is in either of its "on" positions, however, it has been found in actual practice that such additional sockets were not necessary.

A radially extending V-shaped notch or recess 67 is formed in the top part of the lever 53 and the open end of the V-shaped notch confronts the wheel 45. The bottom surface of the notch 67 provides a bearing surface for two resetting levers 68 and 69. These levers are pivotally mounted about the shank of a screw 60 which is carried by and extends above the notch 67. The free ends of these resetting levers extend radially outwardly toward the wheel 45. The side walls 70 and 71 of the notch 67 form stops for levers 68 and 69, respectively. Spring means is provided for spreading the free ends of the levers. This spring means includes a spring wire 73 which has one end connected at 74 to the lever 68 and the other end 75 connected with the lever 69. This spring is preferably wound around a reduced end portion 77 of the screw 60, which may be undercut, as shown in Fig. 2 for preventing the accidental displacement of the spring. When the lever 53 is in neutral position, the levers 68 and 69 lie outside the path of movement of the actuator 47.

Any approved type of switch may be utilized. One such is that manufactured by Cole Hersee Co. of Old Colony, Boston, Mass., and known as "40° swing turn signal switch." In such type of switches, when the lever 53 is in the neutral or "off" position, as shown in Fig. 1, no current flows therethrough. When the hand operated lever 53 is in the position shown in Fig. 3, a front light and a rear light of the vehicle are illuminated and preferably through an intermittent interrupter caused the blinking of these lights. At that time the cars 57 abut the upper stop 51, as viewed in Fig. 3. When the hand operated lever 53 is moved so that it abuts the stop 51, as viewed in Fig. 3, the left front and left rear light are illuminated preferably intermittently.

The rotating actuator 47 of the wheel is utilized for returning the hand operated lever to its neutral position, after the operator of the vehicle rights the vehicle, after completing the turn. For example, if a right turn is to be made and the operator desires to signal such turn, he will move the hand operated lever forwardly (as viewed in Fig. 2) to the position shown in top plan view in Fig. 3; then as the operator turns the steering wheel 24 in a clockwise direction, causing the hub 22 also to move in a clockwise direction, the wheel 45 will be moved in a counterclockwise direction. These directions are indicated by the arrows in Fig. 3. When the lever 53 is in the position shown in Fig. 3, the lever 68 will have been moved from a position out of the path of movement of the actuator 47 to a position in the path of movement of said actuator. The actuator 47 on striking the lever 68 will merely cause the said lever to move in a clockwise direction, about its pivot, away from its stop 70. This is shown in Fig. 4. After the actuator 47 clears the lever 68, the spring 73 will return the lever 68 to against its stop 70. This oscillating movement of the lever 68 will continue to occur upon each revolution of the wheel 47. After the turn has been made, the operator, to right the car, will move the steering wheel 24 and the drum 22 in a counterclockwise direction, causing clockwise motion to be imparted to the wheel 45, as indicated by the arrows in Fig. 5. Now when the actuator 47 engages the inner side of lever 68 (or the under side as viewed in Fig. 5), it will cause a counterclockwise motion to be imparted to the hand operated lever 53 through the stop 70. The position and the shape of the levers 68 and 69 and the shape of the actuator 47 are such that the actuator will move the hand operated lever 53 to adjacent the neutral of "off" position, i. e. to where the balls 61 are started into the sockets 66; these balls will then cam the lever 53 into the neutral position wherein the resetting levers lie beyond the path of movement of the actuator 47. It will of course be understood that the actuator 47 of the wheel 45 cooperates with the lever 69 in the same manner as described with this operation of the lever 68, when the hand operated lever is pulled forwardly, as viewed in Fig. 2 or to the lower stop 51 as viewed in Fig. 3.

In another aspect of the invention, two separate pivots may be provided for the resetting levers, as shown in Fig. 9. The pivots for the levers are shown at 154. In this embodiment the hand operated lever 153, which is the equivalent of lever 53, is also provided with a recess or notch 167. The outwardly extending portions of the levers 168 and 169 do not lie in the path of movement of the actuator 47 when the lever is in the neutral position but either of which may be brought into the path of movement of the actuator 47 by manipulating the hand operated lever 153. In this embodiment the outwardly extending side walls of the notch 167 are indicated at 170 and 171 and these walls provide stops for limiting the spreading movement of the outwardly extending portions of said levers 168 and 169. A coil spring is connected with the inwardly extending arms of the levers 168 and 169 and yieldingly maintain the levers against the stops 170 and 171. The inner end of the notch 167 is enlarged as at 167a to accommodate the movement of the levers 168 and 169 when either is swung by the actuator 47.

Thus it is apparent from the foregoing that there has been provided not only a simple and inexpensive mechanism for operating a direction signal switch but also the mechanism is of rugged construction and can be readily applied to any standard make of automobile. The sizes and shapes of the drums, similar to 22, vary somewhat in different makes of automobiles, but in accordance with the present invention, the instant mechanism can be applied very readily. After the position of the housing 25, with respect to the steering column, is determined, the entire mechanism including the switch, the lever and the parts carried thereby, the plate 39 and the wheel 45 carried thereby are movable as an assembly, to a position in which the wheel 45 engages the drum 22, and then the screws 40 are tightened so as to hold the entire assembly in adjusted position.

While the forms of embodiment herein shown and described constitute preferred forms, it is to be understood that other forms may be adopted, all falling within the scope of the claims which follow.

I claim:

1. In a vehicle direction signal, a support; a wheel on the support adapted to frictionally engage and be rotated by the rotating steering mechanism of a vehicle; an actuator mounted on the wheel and rotatable therewith; a switch carried by the support; an oscillating shaft connected with the switch for actuating the switch, said switch having an "off" position and two "on" positions, said shaft being movable in one direction for moving the switch from the "off" position to one of the "on" positions and movable in the opposite direction for moving the switch from the "off" position to the other "on" position; means yieldingly tending to retain the shaft in any of the three positions in which it is placed; a hand operated lever for moving the shaft to any of said positions; two levers actuated by the hand operated lever; stops on the hand operated lever for limiting the movement of the two levers; spring means yieldingly urging the levers against said stop, one only of said two levers being movable by the hand operated lever into the path of movement of the actuator on the wheel when the hand operated lever is moved to one of the "on" positions and the other only of said two levers being movable by the hand operated lever into the path of movement of the said actuator when the hand operated lever is moved to the other of the "on" positions.

2. In a vehicle direction signal, a support; a wheel on the support adapted to frictionally engage and adapted to be rotated by the steering mechanism of a vehicle; an actuator axially mounted on the wheel and rotatable therewith; a switch carried by the support; an oscillating shaft connected with the switch for actuating the switch, said switch having an "off" position and two "on" positions, said shaft being movable in one direction for moving the switch from the "off" position to one of the "on" positions and movable in the opposite direction for moving the switch from the "off" position to the other "on" position; means yieldingly tending to retain the shaft in any of the three positions in which it is placed; a hand operated lever for moving the shaft to any of said positions; two levers extending radially from the shaft and pivotally actuated by the hand operated lever; stops on the hand operated lever for limiting the movement of the two levers; spring means yieldingly urging the levers against said stop, one only of said two levers being movable by the hand operated lever into the path of movement of the actuator on the wheel when the hand operated lever is moved to one of the "on" positions and the other only of said two levers being movable by the hand operated lever into the path of movement of the said actuator when the hand operated lever is moved to the other of the "on" positions.

3. In a vehicle direction signal, a support; a wheel on the support adapted to frictionally engage and adapted to be rotated by the steering mechanism of a vehicle; an actuator mounted on the wheel and rotatable therewith; a switch carried by the support; an oscillating shaft connected with the switch for actuating the switch, said switch having an "off" position and two "on" positions, said shaft being movable in one direction for moving the switch from the "off" position to one of the "on" positions and movable in the opposite direction for moving the switch from the "off" position to the other "on" position; means yieldingly tending to retain the shaft in any of the three positions in which it is placed; a hand operated lever for moving the shaft to any of said positions; means comprising two spring pressed levers carried by the hand operated lever and having the free ends thereof extending toward said wheel; stops on the hand operated lever for limiting the movement of the two levers, said spring pressed levers being yieldingly urged against said stops, one only of said two levers being movable by the hand operated lever into the path of movement of the actuator on the wheel when the hand operated lever is moved to one of the "on" positions and the other only of said two levers being movable by the hand operated lever into the path of movement of the said actuator when the hand operated lever is moved to the other of the "on" positions.

4. In a vehicle direction signal, a support; means for attaching the support to a steering column of a vehicle; a second support; a wheel on the second support adapted to frictionally engage and be rotated by the rotating steering mechanism of a vehicle; an actuator mounted on the wheel and rotatable therewith; a switch carried by the second support; an oscillating shaft connected with the switch for actuating the switch, said switch having an "off" position and two "on" positions, said shaft being movable in one direction for moving the shaft from the "off" position to one of the "on" positions and movable in the opposite direction for moving the switch from the "off" position to the other "on" position; means yieldingly tending to retain the shaft in any of the three positions in which it is placed; a hand operated lever for moving the shaft to any of said positions; two levers actuated by the hand operated lever; stops on the hand operated lever for limiting the movement of the two levers; spring means yieldingly urging the levers against said stop, one only of said two levers being movable by the hand operated lever into the path of movement of the actuator on the wheel when the hand operated lever is moved to one of the "on" positions, and the other only of said two levers being movable by the hand operated lever into the path of movement of said actuator when the hand operated lever is moved to the other of the "on" positions, said second mentioned support, said wheel, said switch and said shaft forming an assembly slidable radially with respect to the steering column; and means for securing the second support in adjusted position on the first support.

ROBERT P. DONLEY.

References Cited in the file of this patent

UNITED STATES PATENTS

| Number | Name | Date |
|---|---|---|
| 2,034,414 | Pagendarm | Mar. 17, 1936 |
| 2,308,108 | Redding | Jan. 12, 1943 |